United States Patent [19]
Elings et al.

[11] Patent Number: 5,418,363
[45] Date of Patent: May 23, 1995

[54] SCANNING PROBE MICROSCOPE USING STORED DATA FOR VERTICAL PROBE POSITIONING

[75] Inventors: Virgil B. Elings; John A. Gurley, both of Santa Barbara, Calif.

[73] Assignee: Digital Instruments, Inc., Santa Barbara, Calif.

[21] Appl. No.: 202,287

[22] Filed: Feb. 25, 1994

Related U.S. Application Data

[63] Continuation-in-part of Ser. No. 982,871, Nov. 30, 1992, Pat. No. 5,308,974.

[51] Int. Cl.⁶ .............................................. G01B 21/30
[52] U.S. Cl. .................................. 250/306; 73/105; 369/126
[58] Field of Search ............... 250/306, 307; 73/105; 369/126

[56] References Cited

U.S. PATENT DOCUMENTS

| | | | |
|---|---|---|---|
| 5,196,701 | 3/1993 | Foster et al. | 250/307 |
| 5,204,531 | 4/1993 | Elings et al. | 250/307 |
| 5,237,859 | 8/1993 | Elings et al. | 250/306 |
| 5,262,643 | 11/1993 | Hammond et al. | 250/306 |

OTHER PUBLICATIONS

Scanning Chemical Potential Microscope: A New Technique For Atomic Scale Surface Investigation, C. C. Williams And H. K. Wickramasinghe, J. Vac. Sci. Technol. B, vol. 9, No. 2 Mar./Apr. 1991, pp. 537–540.

Nanoscope II Installation Instructions For Version 5.5 And 5Lith.2 Software, Digital Instruments, Inc., 8 Pages.

Surface Electronic Structure Of Si(111)–(7×7) Resolved In Real Space, R. J. Hammers, R. N. Tromp And J. E. Demuth, Physical Review Letters, vol. 56, No. 18, pp. 1972–1975, May 5, 1986.

Article "Separation of magnetic and topographic effects in force microscopy" C. Schonenberger and S. F. Alvarado : 1990 American Institute of Physcis pp. 7278–7280.

Primary Examiner—Jack I. Berman
Assistant Examiner—James Beyer
Attorney, Agent, or Firm—Charles H. Schwartz; Ellsworth R. Roston

[57] ABSTRACT

An apparatus and method for scanning a probe over a surface to either produce a measurement of the surface representative of a parameter other than the topography of the surface or to perform a task on the surface. The scanning operation is divided into two parts and with a first scan to obtain and store topographical information and with a second scan to measure the parameter of the surface other than topography or to perform the task while the probe height is controlled using the stored topographic information.

37 Claims, 6 Drawing Sheets

SCANNING PROBE MICROSCOPE USING STORED DATA FOR VERTICAL PROBE POSITIONING

This is a continuation-in-part of application Ser. No. 07/982,871 filed on Nov. 30, 1992, U.S. Pat. No. 5,308,974, for AN IMPROVED SCANNING PROBE MICROSCOPE USING STORED DATA FOR VERTICAL PROBE POSITIONING.

BACKGROUND OF THE INVENTION

The present invention relates to scanning probe microscopes and more particularly to an apparatus and method for producing a measurement of the surface representative of a parameter of the surface other than topography or for performing a task on the surface. Scanning probe microscopes such as a scanning tunneling microscope or an atomic force microscope or a scanning near-field optical microscope operate by scanning a probe over a surface in which the probe is very close to the surface, lightly contacts the surface, or taps on the surface.

In a scanning tunneling microscope, the tip is at a distance of just a few atoms from the surface in order for a tunneling current to flow between the probe tip and the surface. The tunneling current is either measured to represent the distance between the probe and the surface or more generally Used in a feedback system, which regulates the vertical height of the probe, to keep the current and therefore the distance of the probe from the surface constant. The feedback signal therefore is a measurement of the topography of the surface. In an atomic force microscope the tip may be mounted on a bendable arm and therefore small deflections of the arm are measured in order to detect the profile of the surface under study. Alternately, a feedback system may be used to maintain the probe force constant on the surface and with the feedback signal representing the topography of the surface.

Also, the shear force between the sample surface and a laterally oscillating probe can be used to track the surface, as described by M. Taubenblatt, Appl Phy Lett 54(9), 1989, and in U.S. Pat. No. 5,254,854.

Both types of microscopes described above are variations of a general device referred to as a scanning probe microscope. Originally, scanning probe microscopes only used the two types of interactions described above, which are specifically the tunneling current or the contact force with the atomic force microscope. These types of interactions were used to adjust the height of the probe to trace the topography of the surface.

There have been a number of recent developments which include the use of other types of interactions between the probe and the surface so as to attempt to form different types of measurements or images of the surface. For example, it may be desirable to produce images of a surface representative of parameter such as Van der Waals forces, magnetic forces, electric forces, ionic conductance, electrochemical activity and light intensity, wavelength or polarization. Since these new types of interactions measure parameters of the surface other than the topography of the surface, it is difficult to measure these new types of interactions while at the same time measuring topography.

The prior art scanning probe microscopes which have tracked the surface of a sample with a probe tip by sensing some parameter have included, as indicated above, tunneling current, contact force, shear force, Van der Waal attractive force, magnetic force, electrostatic force, ionic conduction, electro-chemical activity and light intensity, wavelength or polarization. Some of these parameters such as tunneling current, contact force, and shear force are generally easy to sense and are representative of the topography of the surface.

Others of these parameters, such as the magnetic force, are more difficult to detect or may not be directly related to the topography of the surface. This causes any measurement signals, such as feedback signals, responsive to these parameters, to either be marginal or unstable and not useful as a position signal. For example, some of these parameters are not continuous across the surface, i.e. the magnetic force may vary over a surface, disappearing or changing direction from down to up. Therefore, any position signal from these parameters is not stable and so the probe is not able to track the surface using these other parameters.

There are times when it is desirable to provide an image of the surface, representative of parameters other than topography and therefore, it would be advantageous when measuring these parameters, other than topography, which may be weak or discontinuous to not rely on these interactions for position information to control the height of the probe over the sample surface. It would therefore be advantageous for the measurement of such other parameters to move the probe a known distance away from the surface at all points along its contour while measuring these other parameters. For example, a fixed separation is useful when measuring electro-chemical currents on a fluid covered surface. In this case, the desired spacing is too large to use tunneling currents to control the probe height and even if the spacing were reduced, the electro-chemical and tunneling currents would be combined so as to confuse the position control system.

One important example of a desirable parameter for measurement, other than topography, is the measurement of magnetic fields at a sample surface. One prior art attempt as suggested by Rugar and Wickramasinghe, Appl Phys Lett 52, 18 January 1988, p 244, included vibrating a magnetic probe or tip above the surface and detecting the change in the frequency of vibration due to the sample. The sample caused both magnetic forces and Van der Waal attraction of the probe and so the feedback data contained both magnetic and probe height information. For many samples, these forces are extremely weak and give a poor feedback signal which causes the probe to hit and stick to the sample or drift away from the surface. As a result, the technique as suggested by Rugar and Wickramasinghe has not found widespread use.

Another technique for measuring the magnetic fields is that suggested by Moreland and Rice, which uses a tunneling microscope with a flexible magnetic probe or tip supported on a cantilever. The feedback signal is a tunneling current which is used to keep the tip just above the surface. Magnetic attraction pulls the flexible tip toward the surface and the position control system then lifts the tip back into position by bending the cantilever. Thus, the magnetic field patterns appear to be raised and lowered regions of the surface. Unfortunately, this mixing of position and magnetic data is a disadvantage to the Moreland and Rice system since inaccuracies are introduced. In addition, the sample must be electrically conducting to obtain a tunneling current and this is a disadvantage for many important magnetic media such as magnetic tape or magneto-optical disks which are not conducting.

As can be seen from the above discussion, in general it would be desirable to be able to scan a probe relative to a surface at a known height to measure a parameter other than topography. In addition, scanning probe systems have the capability to modify or construct surface features on a very fine scale. Typically, such functions may eliminate or are not compatible with a position feedback signal. In the prior art, the scanning probe measurements other than topography, have been carried out or tasks performed while simultaneously sensing the height of the probe. Two prior art patents, which are directed to improvements in scanning which may be used in the present invention, are the Elings and Gurley patent, U.S. Pat. No. 4,889,988 and the Elings and Maivald patent, U.S. Pat. No. 4,954,704.

The Elings and Gurley patent is directed to the use of digitally controlled motion of the probe or sample in scanning probe microscopes and teaches the use of digitally stored position data to better control the scanning motion of the scanning probe microscope. This patent is directed to the measurement of topography and not to the measurement of sample surface properties other than topography. However, the present invention may use the digitally controlled motion of the Elings and Gurley patent for the scanning probe of the present invention and the teachings of this patent are therefore incorporated into the present application.

The Elings and Maivald patent teaches a method of rapid scanning in which stored digital topographical data is used to control the return motion of a probe so that it can move rapidly above the sample surface without any risk or damage but still allow the probe to be quickly positioned for the next scan. However, this patent does not have any indication of the measurement of properties of the sample other than topography during the return scan or any subsequent scan. This patent may also be used in the present inventions to control the scanning and its teaching are incorporated into the present application.

Both the Elings and Gurley and Elings and Maivald patents, although directed to improvements in scanning and therefore useful in the present invention, do not anticipate the measurement of properties of the sample surface other than topography or performance of a task at the sample surface, which is the focus of the present invention.

SUMMARY OF THE INVENTION

The present invention is directed to a two-phase scanning apparatus and method. The invention first scans the surface topography of a sample using an accurate position sensor such as a tunneling current, an atomic force probe, or a shear force probe to store a precise representation of the topography of the surface in memory. The present invention then secondly, uses this stored topographical information or data calculated from the stored information to accurately position the probe with respect to the surface while another measurement is taken of the surface other than topography or some task is performed. This second measurement or task may be performed at any position when the previously measured topography provides an adequate knowledge of the position of the probe relative to the surface. It is not necessary to perform the second function exactly at the position where the topography was measured, or even to exactly track the topography. The topographical sensing function followed by the controlled position measurement or task function may be performed on a point line raster image basis, or any combination, as long as the topography measurement allows for suitable positioning of the probe to achieve the desired results for the second measurement or task.

In the second phase of the operation of the present invention, there is not necessarily any direct position feedback since the probe may be positioned entirely by using the stored data. In the second phase, the probe positioning apparatus uses the stored data representative of the surface or some function of the stored data to position the probe as desired for the selected measurement or task. The preferred probe position during the second phase of the operation depends on the measurement or task so that the probe may be in contact with the surface, or above the surface by an optimum distance dependent upon the measurement or task, or even alternately lifting above and then contacting the surface or any other type of movement relative to the surface. For instance, one positioning method would just be to add a constant vertical distance to the stored data to control the probe at a fixed height above the surface during the second phase. Another method might be to use an average of the stored data on the slope of the stored data to have the probe go over the surface in a straight line path during the second phase.

The present invention may therefore use the stored topographical data to carry out other measurements or activities with the scanning probe instrument to provide for a wide range of applications. For example, the present invention may provide for the measurement of magnetic fields at the surface of magnetic recording media, the measurement of the temperature or electric fields at the surface of an operating integrated circuit, the light intensity at different distances above a surface, the micromachining of quantum well transistors, manipulation of strands of DNA identified by attached molecules, electro-chemical mapping of biological cell memories, or other types of measurements or activities which can be enhanced by the prior accurate topographical measurement.

DESCRIPTION OF THE PREFERRED EMBODIMENTS

Figure 1:
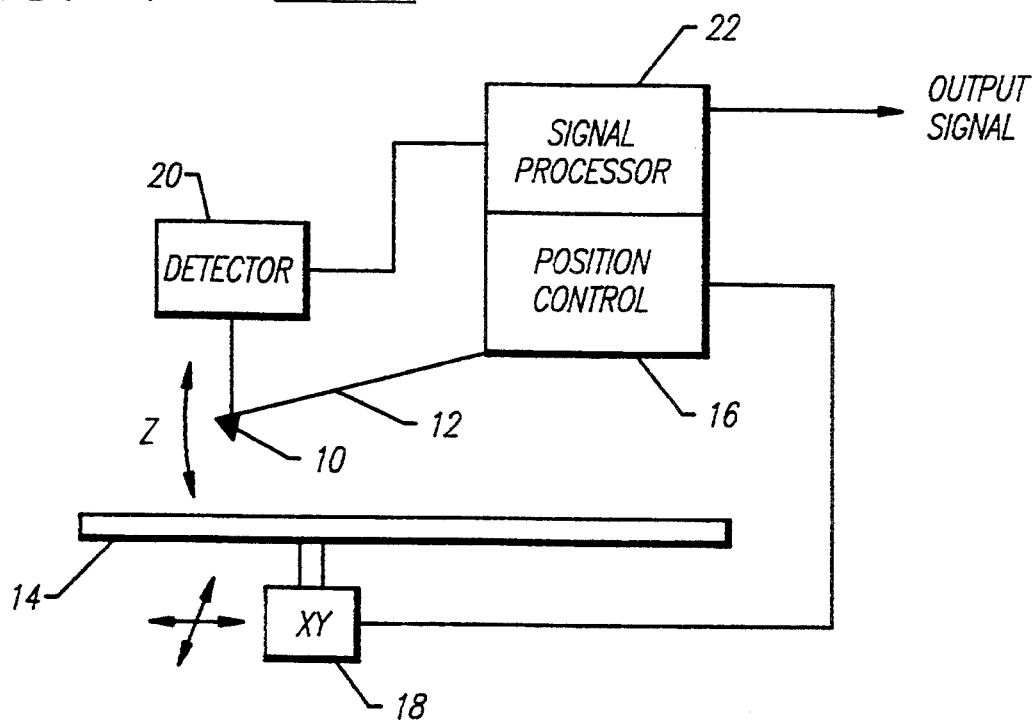
FIG. 1 illustrates a prior art structure suggested by Rugar for the measurement of magnetic fields at a sample surface.
Figure 2:
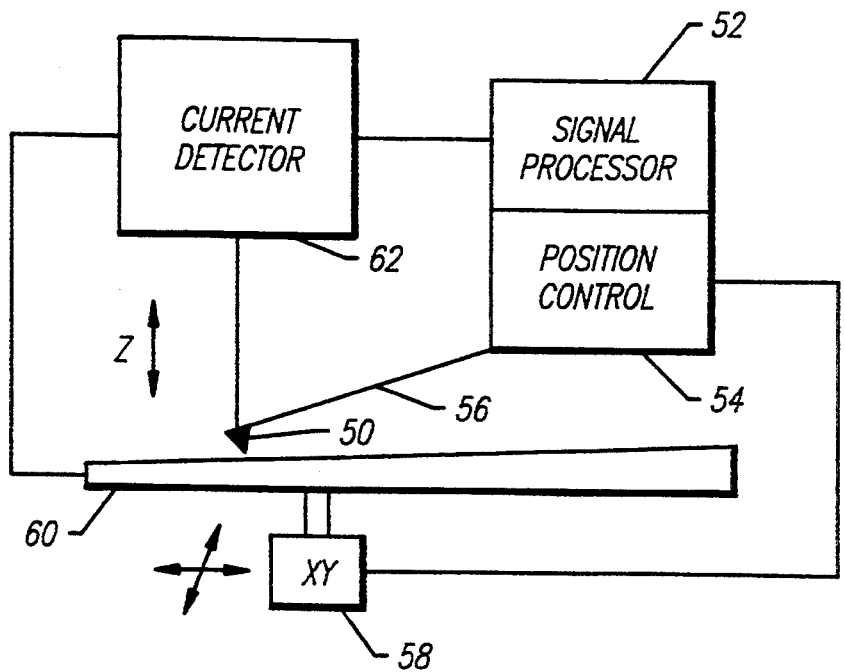
FIG. 2 is a prior art structure suggested by Moreland and Rice, also for detecting magnetic fields at a sample surface.

FIGS. 1 and 2 are representative of prior art devices for providing the measurement of magnetic fields at the surface of the sample. For example, as shown in FIG. 1, in a prior art device, as suggested by Rugar, a magnetic tip 10 supported at the end of a cantilever arm 12 is vibrated above a surface of a sample 14. The vibration of the magnetic tip and the X, Y and Z positioning is provided by a position control 16 which is connected to an X Y positioner 18 and to the magnetic tip 10 through the cantilever arm 12. A detector 20 detects the change in frequency in vibration of the magnetic tip 10 due to various forces at the surface of the sample 14.

A feedback signal is provided from the detector 20 to a signal processor 22 so as to provide an output signal from the signal processor, theoretically representative of the magnetic field. The signal processor 22 is coupled to the position control 16 to control the position of the tip 10 relative to the sample 14. Unfortunately, the sample would normally cause a number of forces to act on the magnetic tip 10, including both magnetic fields and Van der Waal attraction forces and so the feedback signal would contain both magnetic and probe height information. In addition, for many samples, these forces are extremely weak giving a poor feedback signal which causes the probe to hit and stick to the sample surface or drift away from the surface. The various difficulties with this type of device has limited the use of the Rugar device for measuring magnetic fields or any other parameters of the sample surface.

FIG. 2 illustrates another magnetic field measurement technique as suggested by Moreland and Rice. In the Moreland and Rice device, a tunneling microscope includes a flexible magnetic tip 50 positioned above the surface of a sample 60. A feedback signal, which is a tunneling current produced by a current detector 62, is applied to a signal processor 52 which in turn controls a position control 54 to keep the tip 50 just above the surface. The tip is supported above the surface of the sample 60 at the end of a cantilever 56 and as magnetic attraction pulls the tip 50 towards the surface, the position control 54 then lifts the tip back into position by bending the cantilever. The position control 54 also controls an X Y positioner 58.

Unfortunately, with the Moreland and Rice device, the magnetic field patterns appear to be raised and lowered regions of the surface, so that there is a mixing of the topography and magnetic data. This of course is a disadvantage since the different types of data cannot be separated and a true image of the magnetic fields is not possible. In addition, the sample surface must be electrically conducting in order to obtain a tunneling current. This is a disadvantage for many important magnetic media such as magnetic tape or magneto-optic disks, which are not conducting. Therefore, the Moreland and Rice structure has not found wide use for measuring magnetic fields.

FIGS. 3 through 6 illustrate, first in generalized form and then with specific embodiments, the apparatus and method of the present invention. In the descriptions of FIGS. 3 through 6 of the present invention, the same reference characters are used to describe elements, which provide either a similar or the same function. In addition, although reference sometimes is made to an atomic force microscope and at other times to a scanning tunneling microscope, it is understood that in using applicant's invention that the microscope can be any scanning probe microscope.

In addition, in the various described embodiments, a separate X Y positioner is shown to move the sample relative to a probe tip. In turn, the probe tip is shown to be moved in the Z direction relative to the sample. It is to be appreciated that in place of the sample being moved in the X Y directions, the probe tip could be moved in the X Y directions in addition to the height or Z direction movement of the probe tip relative to the sample surface. Therefore, although the position control is shown only to control the Z or height movement of the probe tip relative to the sample, all of the movements can be combined in the probe tip and with the sample maintained stationary. Alternately, the probe tip could remain stationary and with the sample moved, both in the X Y directions and in the Z direction. For simplicity of description, the various movements are as shown in the Figures but as indicated above, the invention is not to be limited to these specific structures.

Figure 3:
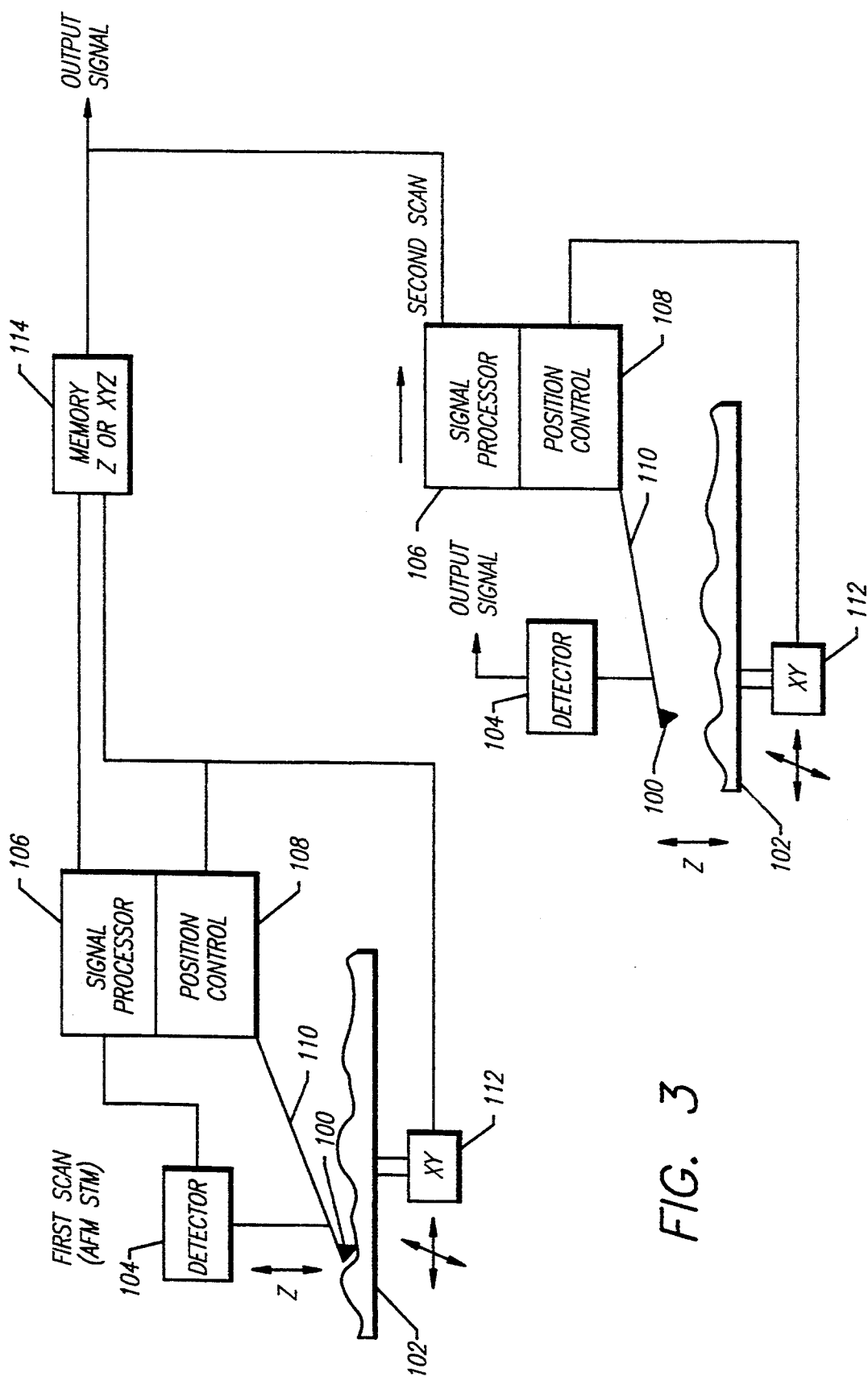
FIG. 3 illustrates in general, the present invention for detecting a parameter of a sample surface other than topography or performing a task at the sample surface.

FIG. 3 illustrates in generalized form the apparatus and method of the present invention. As can be seen in FIG. 3, the present invention is a two-phase scanning instrument which first scans the surface topography of a sample using an accurate position sensor to store a precise representation of the topography of the surface in memory. The stored topographical information is then used to accurately position the probe with respect to the surface during a second scan while another measurement other than topography or a separate task is performed.

In some cases, this method can be used to improve measurements which can currently be done while topography is being measured, but with more flexibility. For instance, in a scanning near field optical microscope the topography is measured simultaneously with light transmission through the sample, by vibrating the tip horizontally and using the amplitude of oscillation, reduced by shear forces when the tip is near the surface, in a feedback system to keep the tip a fixed distance about the surface of the sample. At the same time, the amount of light from the tip transmitted through or reflected from the sample is measured. Alternately, one could measure the light intensity emitted from a surface of say a laser or light emitting diode. An improvement in some cases would be to use the present method to measure the topography this way and then lift the tip, stop the horizontal vibrations, and measure the light transmission as the tip is guided over the surface using the stored topographical information. In another example, the light "funnel" of the near field optical microscope may be built into an atomic force microscope probe, as described in U.S. Pat. No. 5,166,502 by Prater and Albrecht, so that the topography can be measured with AFM tip, and the light transmission measured in the second pass with the tip lifted above the surface.

In another application, one could use this method to measure the light distribution at different heights above, say, a surface emitting laser, to study the functioning of the laser. In this case, one might do one scanline to measure topography, and then several scanlines with the probe controlled at different heights above the surface using the stored topographical information. This process could be repeated to obtain images of the light intensity at different heights above the surface. These scans could be as simple as calculating an average height and slope of the surface from the topographical data and then scanning the probe along a straight line during the scans where the tip is raised above the surface.

The present invention may provide for this two-phase operation using any measurement of topography adequate to properly position the probe for the second measurement or task or some combination of these because the probe may be positioned during the second phase of the operation by using only the stored data or some function of the stored data. It is not necessary to have any direct position feedback during the second phase, but it is to be appreciated that if such feedback would be desirable, it may be used. Normally, however, in the second phase of the operation, the probe position control uses the data stored in memory which describes the topography of the surface to position the probe as desired for the measurement other than topography or the performance of some other task. The preferred probe position relative to the surface would depend on the measurement or task, but it is to be appreciated that the probe may be in contact with the surface, or above the surface by an optimum distance, or even alternately lifting above and then contacting the surface or moving in other ways. In any case, the motion of the probe in the vertical direction would be calculated from the stored topographical data.

As shown in FIG. 3, a probe 100 is illustrated either in contact with or just above the surface of a sample 102. If the probe is detecting topographical information on the basis of an atomic force microscope, then the probe would normally be just in contact with the surface of the sample 102. However, if the probe is detecting the topography of the surface of the sample 102 using a scanning tunneling microscope or a shear force microscope, then the probe would be positioned just above the surface. Depending upon the type of scanning probe microscope that is used, a detector 104 detects the topography of the surface of the sample 102 and provides a signal which is applied to a signal processor 106.

In a normal scanning probe microscope, a signal processor provides signals to a position control 108 which may control the Z position of the probe 100 shown at the end of a cantilever 110 and which also may provide for the X Y position between the probe 100 and the sample using an X Y positioner 112. As indicated above, the probe 100 could alternately be controlled in the X Y position, thereby eliminating the need to move the sample 102. Similarly, the sample 102 could be not only moved in the X Y direction but also in the Z direction and with the probe tip 100 maintained stationary.

The output from the signal processor 106, representative of the Z position of the probe 100 or the sample 102 is then stored in a memory 114. Optionally, the X Y positions could be stored but they can be known from the sequence of the Z data. The information thereby stored in the memory 114 is essentially the topography of the surface of the sample 102. This stored topography data may then be provided at a later time as a signal representative of the topography of the surface of the sample 102. Specifically, the stored information representative of the topography of the sample 102 may be supplied during a second scan of the surface of the sample 102 as an input signal to the signal processor 106. The stored topographical signal can thereby control the position control 108 to have the probe tip in a desired X Y Z position relative to the now known topography of the surface so as to provide for some measurement or perform some task other than topography.

The probe tip 100 may incorporate other features so that the detector 104 may now be used to carry out other measurements with the scanning probe instrument or the probe tip may perform other activities. For example, during the second scan, the following measurements or activities may be performed; the measurement of magnetic or electric fields; the measurement of surface temperature; the measurement of surface elasticity, or friction or chemical makeup; the measurement of the phase of an oscillating probe; various electro-chemical measurements; the micromachining of the surface; the manipulation of strands of DNA, and the measurement of light intensity or wavelength. All of these other measurements or activities can occur with great reliability, since during the second scan of the surface, the topography of the surface had been mapped so that the probe position may either be in contact with the surface or above the surface by an optimum or constant distance or any other desired movement relative to the surface so as to produce the most reliable further measurement or activity.

Figure 4:
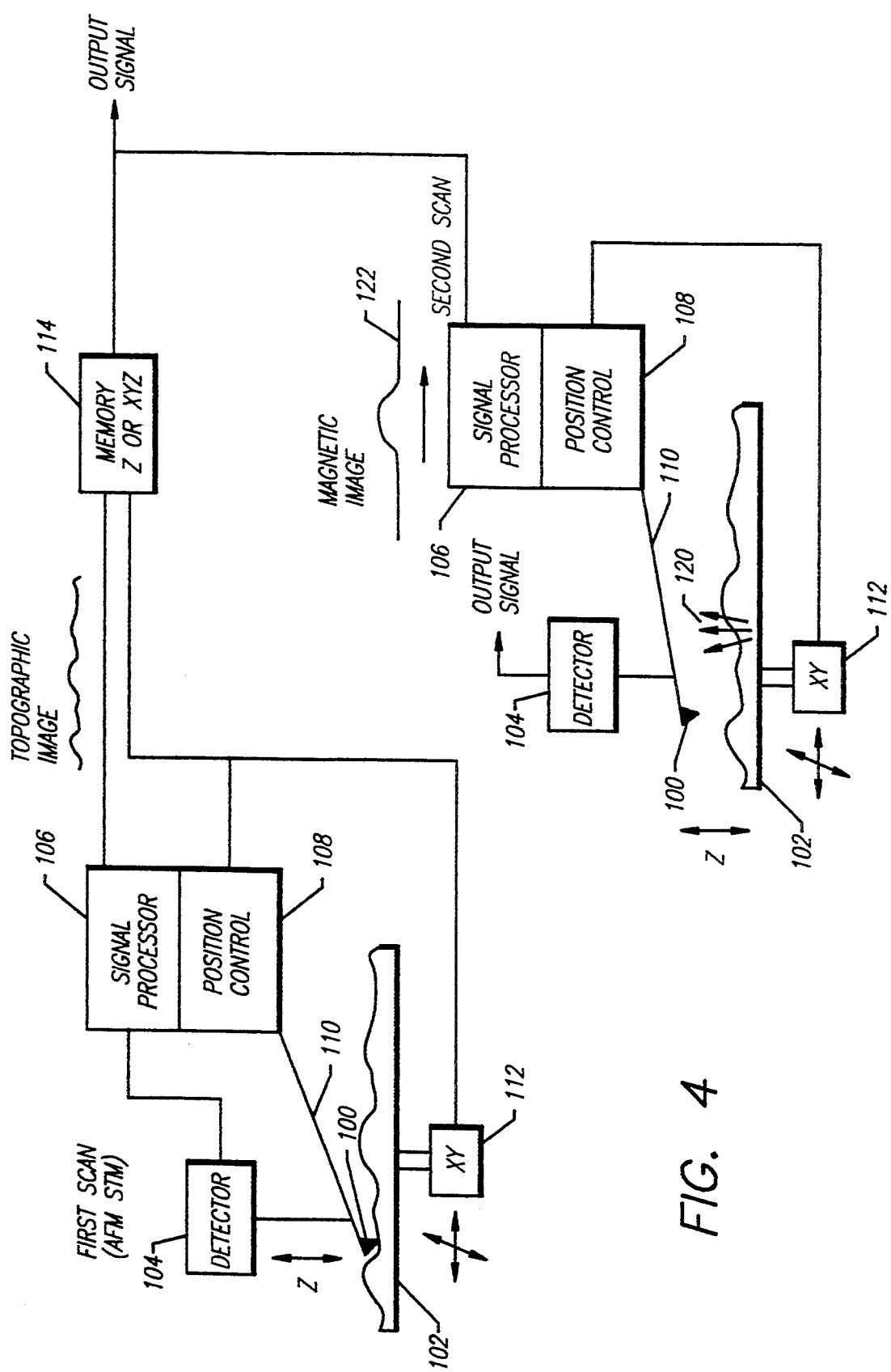
FIG. 4 is a first embodiment of the present invention for measuring magnetic fields at the surface of a sample.
Figure 5:
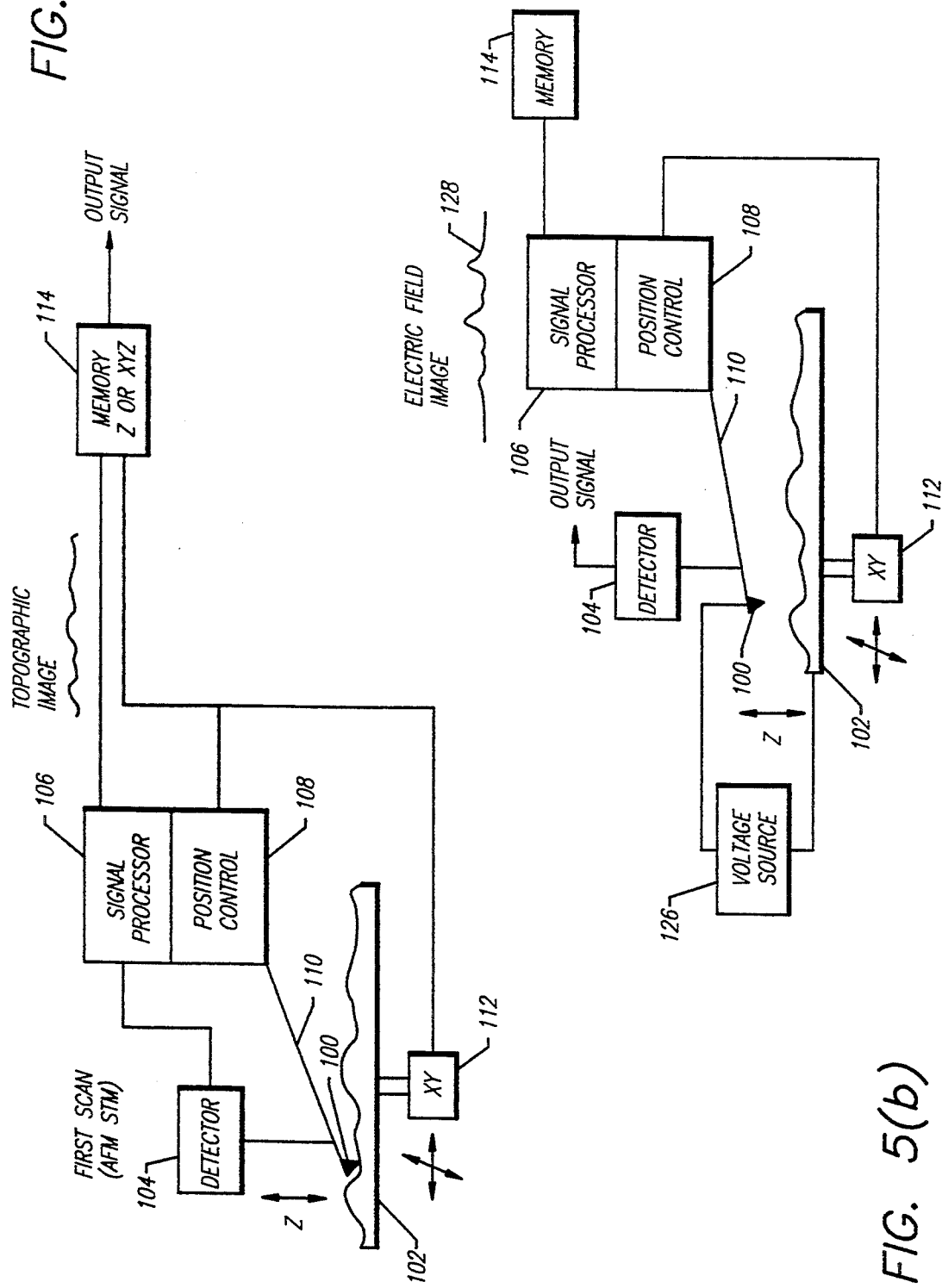
FIG. 5(A-B) is a second embodiment of the present invention for measuring electric fields at the surface of a sample.
Figure 6:
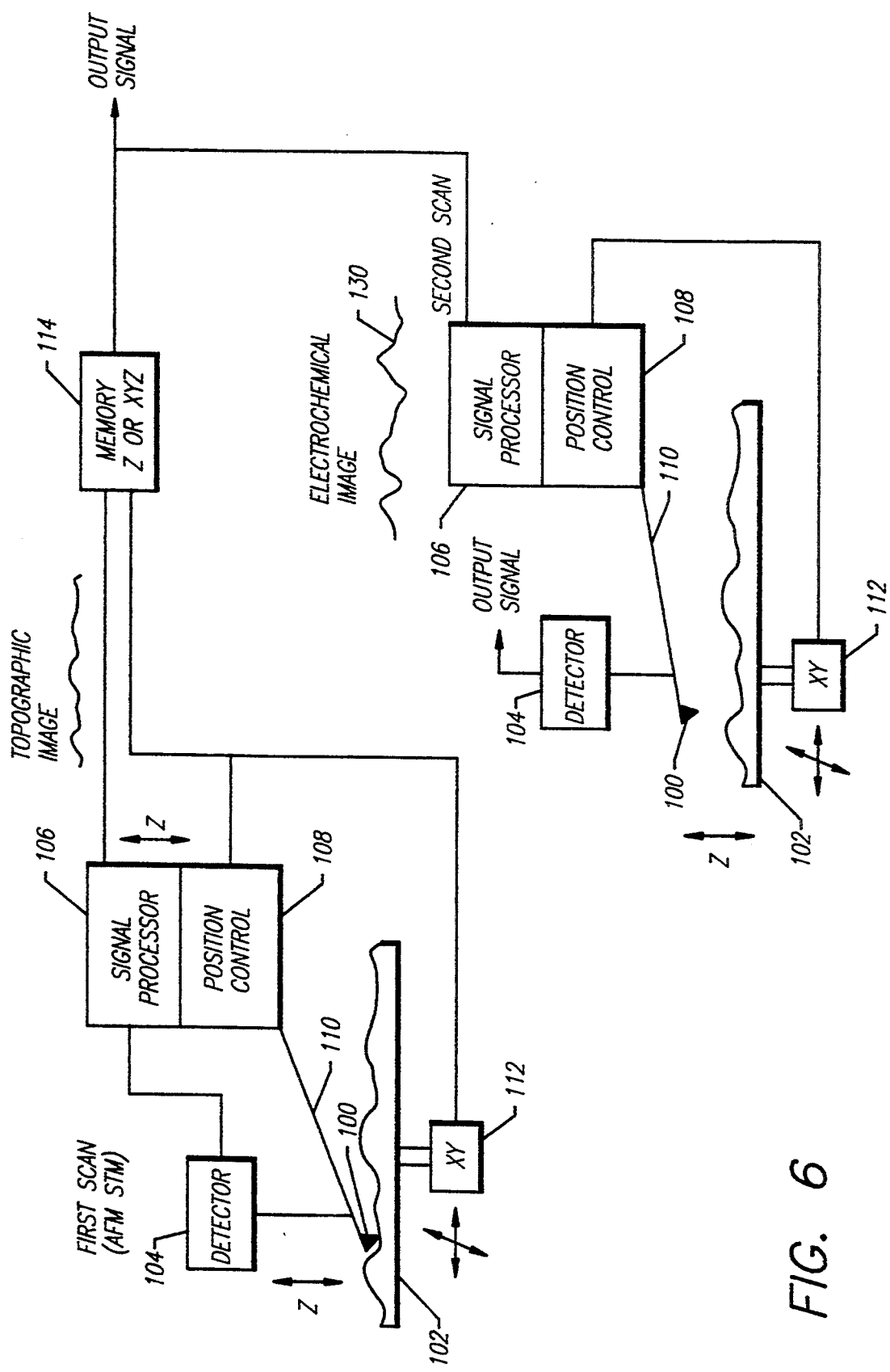
FIG. 6 is a third embodiment of the present invention for measuring electro-chemical currents at the surface of a sample.

As indicated above, FIGS. 4–6 illustrate three specific embodiments of the invention, but it is to be appreciated that many other types of measurements or activities may be performed other than the specific embodiments illustrated in this application.

FIG. 4 illustrates a specific embodiment of the invention for the measurement of magnetic fields wherein the sample 102 may be a magnetic digital storage medium such as a hard disk. In the embodiment of FIG. 4, the probe 100 would incorporate a magnetic tip and preferably, the first scan for topography would be provided by an atomic force microscope (AFM). As indicated above, the present invention provides for at least two scans of the surface of the sample. In the embodiment of FIG. 4, first there is the AFM scan to measure and store the topography of the sample 102 in the memory 114. In a second scan, the magnetic tip 100 is maintained above the surface of the sample 102 to measure the magnetic forces in the sample. In FIG. 4, parts of the apparatus have been duplicated to illustrate the first and second scans.

As shown in FIG. 4, and specifically as shown in the second scan, magnetic forces 120 are localized at a particular portion of the sample 102. During the second scan, the deflection of the cantilever 110, as provided by the magnetic forces 120 operating on the tip 100, may be detected by the detector 104 to produce an output signal representative of the magnetic field image. This is shown by signal 122 in FIG. 4. The deflection of the cantilever 110 can be measured directly by the detector 104. Alternately, another technique which may be used is to vibrate the cantilever near resonance and with the resulting amplitude of vibration or phase of vibration measured by the detector 104 to detect the magnetic field. Also the topography could be measured by tapping an oscillating tip on the surface of the sample as described in U.S. Pat. No. 5,266,801 entitled *Jumping Probe Microscope* by the same inventors. The topography could also be measured in the non-contact AFM mode according to Rugar.

Most importantly, however, the present invention provides for the probe 100 to be guided over the surface of the sample 102 reliably and accurately using the stored topographical information from the memory 114 irrespective of the strength, direction or discontinuities of the magnetic forces. The present invention also works for either conducting or non-conducting samples since if the sample is non-conducting an atomic force microscope would be used to detect topography and if the sample is conducting then either an atomic force or a scanning tunneling microscope could be used.

The use of a vibrating or oscillating cantilever can also provide for the detection of a magnetic field gradient. Specifically, a constant magnetic field causes the center of oscillation to shift while a magnetic field gradient changes the effective spring constant and shifts the resonant frequency of the cantilever and probe tip. The oscillation may therefore may be driven just off resonance and the change in detected resonant frequency due to the magnetic field gradient may be observed as changes in the amplitude of oscillation. Since the probe tip 100 during the second scan is not being used for height measurement and is not in contact with the surface of the sample, the embodiment of FIG. 4 provides for a pure measurement of the magnetic force or force gradient as a function of the X Y position of the probe tip 100. Both attractive and repulsive magnetic force can be measured since the tip is off the surface and can respond in either direction.

A variation of the invention includes the measurement of a soft magnetic film such as permalloy where it is undesirable to have the magnetic tip touch the magnetic material. In this case, the topography is measured on either side of the magnetic material by the probe touching the surface only near the extremes of the scan. From this topographical data, a straight line path at some selected distance above the surface is calculated and the probe is then scanned along this line during the second phase. In this application, then, the tip never touches the magnetic material except at the edges of the scan, and therefore does not perturb the magnetic orientation of the sample. This particular application demonstrates that the controlling signal for the probe can be calculated from a topographical measurement which is not made at all positions where the subsequent measurement will be made.

It has been found that when the oscillating cantilever is scanned above the surface, the amplitude of oscillations can be affected by hydrodynamic affects due to the air between the cantilever and the sample surface. This causes a topography artifact to appear in the data on the second scan. This artifact is reduced if instead of the amplitude of oscillation, the phase of the oscillating tip with respect to the driving force oscillating the cantilever, such as a piezoelectric device, is recorded as the data. This phase measurement is sensitive to the shift in the resonant frequency due to the magnetic field, but is not very sensitive to the hydrodynamic effect. So, the detectors 104 could contain phase measuring apparatus. One could also measure the phase and then use a feedback process to vary the drive frequency to keep it at the resonant frequency of the cantilever, i.e. to keep the phase constant. This frequency could be recorded as the data, and is a measure of the magnetic field gradient near the surface of the sample.

In the second scan, when the tip is being guided by the stored topographical data or some function of the stored data, the frequency and amplitude of vibration and the speed of the scan can be varied from those of the first scan in order to improve the measurement of the parameter other than topography.

FIG. 5 illustrates another embodiment of the invention which is the measurement of electric field strength of a sample. This type of measurement may also be used for testing integrated circuits. Typically, for the measurement of electric field the tip 100 would be a conducting tip and again the first scan could either be using an atomic force microscope or a scanning tunneling microscope and with the information representative of the topographic image stored in the memory 114. In the second scan, the stored data representative of the topography is used to control the scanning of the conductive tip 100 above the surface of the sample 102. FIG. 5a shows the first scan and FIG. 5b shows the second scan which uses data from the memory.

A voltage source 126 provides for a voltage differential between the tip 100 and the sample 102 to produce an electric field between the tip 100 and the sample 102. This field may be between the surface and the tip, or between the tip and structures below the surface, such as gates in an integrated circuit. This electric field between the tip and the sample results in an attractive force between the tip and the sample which can be measured as the tip is scanned above the sample surface. The attractive force may be varied by varying the voltage between the tip and the sample. In addition, the voltage source 126 may include an oscillating component so that the detector 104 may include filters and phase sensitive detectors to measure the electric field above the sample. The frequency of oscillation could be chosen to be near the resonant frequency of the probe/cantilever structure 110 so as to enhance the sensitivity, or could be at some other frequency.

The non-oscillating component of the voltage between the tip and sample could be controlled in a feedback operation in which it is varied to minimize the oscillation of the tip caused by the oscillating component of the voltage. This minimum occurs when the non-oscillating component is equal to the voltage on the sample. This feedback operation, then could allow a voltage map of the sample to be made with this type of microscope.

Again, the stored topographic information in the memory 114 which is used to control the scanning of the probe tip 100 permits the probe to be maintained at a constant height above the surface of the sample 102 and avoids mixing topographic data with electric field data. One example of the use of the device as shown in the embodiment in FIG. 5 would be the scanning of an integrated circuit to measure the voltage of an operating circuit at various places. The embodiment of FIG. 5 will work even when there is a thin layer of insulating material, such as silicon dioxide, over the circuit which would prevent contact measurements of the circuit voltage. The output signal from the detector 104 may be representative of the electric field image as shown in graph 128.

FIG. 6 shows yet another embodiment of the invention for the measurement of electro-chemical signals at the surface of the sample 102. In FIG. 6 a conducting tip 100 may be used. In a first scan, using either an atomic force or scanning tunneling microscope, the accurate topographical image of the surface of the sample 102 is stored in the memory 114 using the information from the signal processor 106 and the position control 108.

The stored topographical information is then used in a second scan of the surface of the sample 102 to hold the tip 100 an optimum height above the surface for electro-chemical measurement. If the conducting tip were held too close to the surface, tunneling currents or contact currents would interfere with the electro-chemical measurement. Therefore, the use of the stored topographical data allows for an accurate measurement of the desired electro-chemical signals without interference from effects due to the height of the probe tip 100 above the surface. The output signal from the detector 104 representative of the electro chemical image may be as shown in graph 130.

Figure 7:
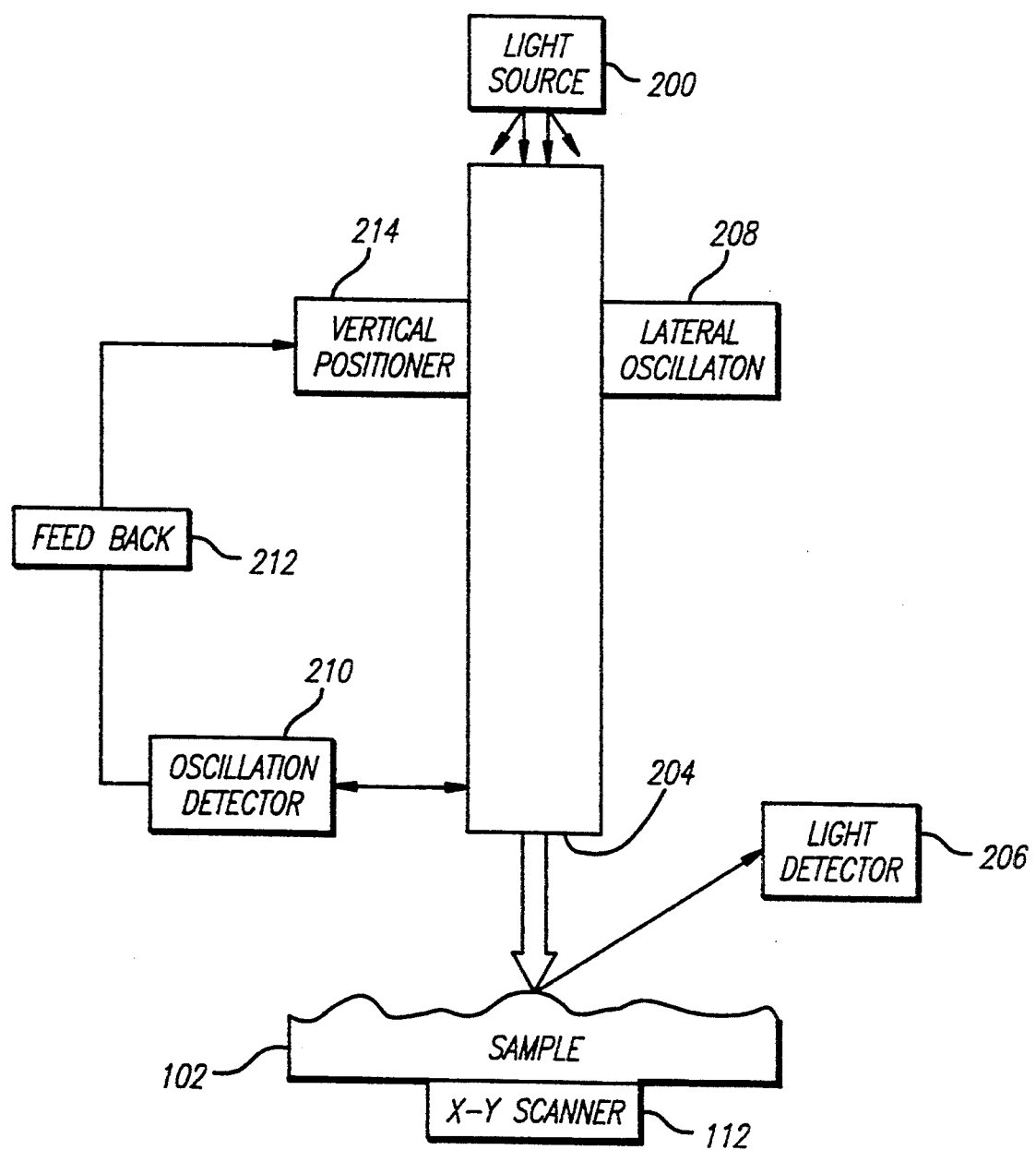
FIG. 7 is a fourth embodiment of the present invention for measuring light transmission through a sample or light emitted from a sample.

FIG. 7 shows a combination shear force/scanning near field optical microscope (SNOM) such as shown in U.S. Pat. No. 5,254,854 to Betzig. Betzig and others do the shear force and optical measurements simultaneously, which means that you cannot optimize the height for shear force and optical sensitivity at the same time. The present invention includes a method of measuring the topography with the shear force technique, setting the height accordingly from the stored topography to track the surface at an optimum height, and then make the NSOM measurement.

Light from a light source 200 is directed into a means for directing the light into an aperture that is smaller than the wavelength of the light. This means it is typically an optical fiber 202 that has been pulled or etched on one end to a small (100 nm wide) aperture 204. If this aperture is brought close to a sample surface 102, the surface is illuminated with a spot approximately the size of the aperture. Either light transmitted through the sample surface, or reflected from the surface from this illumination can be detected by a light detector 206. If the aperture is scanned relative to the sample surface 102 by a X-Y scanner 112, an image of the optical properties may be made with better resolution than the diffraction limit which defines the resolution of conventional light microscopes.

The optical information does not provide sample height data which could be used to track the surface during scanning. In order to scan rough surfaces, an additional surface tracking means is required. Since the typical SNOM probe is a vertically oriented tube, the probe is very stiff and insensitive to vertical forces. This type of probe, however, is quite sensitive to lateral or shear forces.

If a means 208 to laterally oscillate the probe, typically near resonance, and a means 210 to detect this oscillation is added to the SNOM, then the effect of the surface proximity on the oscillation can be used as a surface tracking mechanism similar to the effect of the surface on vertical oscillation in an AFM. The change in oscillation can be a setpoint for a feedback loop 212 that controls a vertical positioner 214 to maintain a constant probe height during lateral scanning. Thus the shear force sensor provides surface tracking for the optical probe. The shear force sensing can be used on its own for surface tracking or in combination with other sensing besides SNOM provided the geometry of the probe is sensitive to shear forces.

Prior art shear force/SNOM's make simultaneous optical and shear force measurements. This is inconvenient in that the probe height cannot be set to optimize the sensitivity for both measurements. In the present invention, a shear force setpoint may be established that optimizes the topography measurement on a first scan, then the probe height may be set based on the stored topography data to optimize the near field measurement.

With all of the embodiments of the invention, the second measurement of the parameter other than topography or the performance of a desired task may be made using any measurement of topography adequate to position the probe for good results. Therefore, there is an alternation between the topography and the second measurement or task which can be chosen in any fashion desirable. For example, if we chose to alternate scan lines then for every other scan line the device functions as a normal scanning probe microscope and during the alternate scan the device detects the parameter other than topography or performs the desired task. The stored signal is then used to control the height or Z position of the probe relative to the surface for all of the various X Y positions. For samples where the topography changes slowly on a line by line basis, the topography need not be measured for each line scanned for the second measurement.

So, across one raster line, the tip would alternate several times between measuring topography and then raising the probe to measure another parameter, etc. The probe could move continuously in a lateral direction or could move in steps at each measurement position.

If it is desired to measure the parameter other than topography or perform a desired task on a point by point basis then again first the height may be measured in the first scan at a given point and then a desired height for the probe maintained in accordance with the previously stored height. If a whole image is used, then typically a scanning pattern is formed by a series of sweeping X axis motions with small Y increments to form a raster which covers the surface area to be measured. For each Y increment the scanning probe microscope scans along the X axis and the height of the sample surface at each point is stored for later use in positioning the probe in the second scan.

The scanning, in general, produces two separate images. One image is of the sample surface topography and the other image is of the other parameter other than topography which has been measured. Separating the two kinds of information provides for an important advantage of the present invention. Other aspects of the invention allow for different types of measurement than is possible with the prior art. If only the second measurement is of interest, topography only need be measured adequately to guide the probe for the second measurement or task.

For example, it is possible to measure both the magnetic fields and the magnetic field gradient. Since there is no contact with the surface during the second scan, the direct deflection of the cantilever by the magnetic force is proportional to the magnetic field strength alone. On the other hand, the resonant frequency of oscillation of a cantilever and magnetic probe tip is shifted by the magnetic field gradient. The field gradients produce a force which changes with distance adding to the spring constant of the cantilever.

Therefore, if desired, both the magnetic field and the magnetic field gradient can be measured by using a sequence of two scans. One scan for topography and then a second scan with an oscillating drive in which the average deflection and the cantilever resonant frequency are observed to obtain both the magnetic field and field gradient. Alternately, a third scan may be provided since the optimum detection height may be different for the magnetic field and the magnetic field gradient. For a very flat surface, however, it might be advantageous to simply measure the slope of the surface before making the second measurement.

Once the first scan is completed and the local topography of the sample is stored, it is possible to create any desired pattern for the second scan. The simplest scheme, as previously mentioned, would be to lift the tip a fixed distance above the local topography. Another scheme would be to calculate a straight line average of the topography and then move the probe along or above this straight line path on the second scan. In addition, much more complicated patterns are possible. For example, it is possible to move the tip back and forth towards the surface (perhaps even touching the surface again), while monitoring some property given by the scanning probe microscope. Since the local surface topography has already been stored, these measurements will be made with respect to a known surface. In this way, it would be possible to measure such things as a 3-dimensional profile of a force field (such as electric, magnetic, Van der Waals or double layer or hydrophobic forces). This technique could also be used to measure contact properties of the sample such as elasticity, plasticity, and friction, for example. It is also important to note that the second scan need not lift above the surface topography as measured in the first scan. It is also possible to push the probe further into the sample on the second trace. This would allow measurements of such sample properties as elasticity or plasticity or the dependence of electrical conductivity versus force, for example. The embodiments described so far have all stored a measure of sample surface topography and used this stored topography to make a second measurement referred to the stored information. It is of course possible to store information other than topography on the first scan, for example the deflection of a cantilever probe due to an electric field. The second scan will be calculated based on this alternative information. In the case of the electric field measurement, the second scan could be used to compare the electric field at a different height relative to the reference field found in the first scan. Any alternative signal that can be read by a scanning probe microscope could be stored by the computer and used as a reference to guide the vertical position of the probe on the second scan.

It can be seen therefore that the present invention has great versatility in providing for many different measurements at the surface of the sample and with the measurements clearly separated from forces which relate to topography. The present invention provides for the scanning operation to be in two phases and with a first scan to obtain and store topographical information and a second scan to carry out other measurements or interactions with the surface while the probe height is controlled using the stored topographical information.

In addition, the two phase operation could be used to modify or construct on the surface. In the second place, the tip could be very accurately used to mark the surface with a known depth or force relative to the surface, or to travel at a fixed height above the surface, to apply accurate electric fields between the tip and surface. Such techniques have been shown to have potential to construct or modify on a very fine scale. These techniques can benefit from the present invention.

Although the invention has been described with reference to particular embodiments, it is to be appreciated that various adaptations and modifications may be made and the invention is only to be limited by the appended claims.

We claim:

1. In an atomic force microscope including a probe positioned relative to a sample surface and having relative motion between the probe and the sample surface in the X and Y plane and controlled and sensed in the Z direction vertical to the surface to produce data responsive to the topography of the surface, a method for accurately measuring a parameter of the surface or performing a task including the following steps:
   providing a first measurement by the probe of the sample surface in the X and Y plane and controlling and sensing in the Z direction vertical to the surface to produce from the probe data representative of the surface,
   storing the data representative of the surface,
   positioning the probe at at least one point relative to the sample surface in response to the stored data to control the probe in the X, Y and Z directions in accordance with the stored data, and
   measuring a magnetic or electric interaction between the probe and sample during the positioning of the probe relative to the sample surface in response to the stored data.

2. The method of claim 1 wherein the positioning of the probe in response to the stored data is to raise the probe by a fixed amount with respect to the stored data.

3. The method of claim 1 including producing separate images of the topography of the sample and the electric or magnetic interaction measured between the probe and sample.

4. The method of claim 1 wherein the first measurement and the positioning of the probe relative to the sample surface are done on a point by point basis.

5. The method of claim 1 wherein the first measurement and the positioning of the probe relative to the sample surface are done on a line by line basis.

6. The method of claim 1 wherein the first measurement and the positioning of the probe relative to the sample surface are done on an image by image basis.

7. A method for producing an interaction, between a probe and the surface of a sample, including the following steps,
   providing a first measurement of the probe relative to the surface of the sample at a plurality of positions in the X and Y plane,
   controlling the probe during the first measurement at the plurality of positions in a Z direction vertical to the surface to measure the topography of the surface and to produce data representative of the topography at the plurality of positions,
   storing the data representative of the topography of the surface at the plurality of positions,
   positioning the probe relative to the surface of the sample and controlling the Z direction of the probe in accordance with some function of the stored data representative of the topography at the plurality of positions, and
   producing an interaction, between the probe and the sample during the positioning of the probe relative to the sample surface in response to the stored data.

8. The method of claim 7 wherein the measurement of data during the first measurement is provided by an atomic force.

9. The method of claim 7 wherein the measurement of data during the first measurement is provided by a tunneling current.

10. The method of claim 7 wherein the measurement of data during the first measurement is provided by a shear force.

11. The method of claim 7 wherein the interaction between the probe and the sample during the positioning of the probe is a measurement of magnetic forces.

12. The method of claim 11 wherein the measurement of magnetic forces includes a measurement of magnetic fields, magnetic gradients or both.

13. The method of claim 7 wherein the interaction between the probe and the sample during the positioning of the probe is a measurement of electric forces.

14. The method of claim 7 wherein the interaction between the probe and the sample during the positioning of the probe is a measurement of electro-chemical forces.

15. The method of claim 7 wherein the interaction between the probe and the sample during the positioning of the probe is a measurement of light intensity.

16. The method of claim 7 including the additional step of producing separate data from the first measurement and the positioning of the probe using the stored data.

17. The method of claim 7 wherein the interaction between the probe and sample is a force to alter the surface of the sample.

18. The method of claim 7 wherein the first measurement and the positioning of the probe are alternated on a point by point basis.

19. The method of claim 7 wherein the first measurement and the positioning of the probe are alternated on a line by line basis.

20. The method of claim 7 wherein the first measurement and the positioning of the probe are alternated on an image by image basis.

21. Interactive apparatus including an atomic force microscope having a probe positioned relative to a sample surface and having relative motion between the probe and the sample surface in the X and Y plane and controlled and sensed in the Z direction vertical to the surface to produce data representative of the surface, including:
means for providing a first scan by the probe of the sample surface in the X and Y plane and controlling and sensing in the Z direction vertical to the surface to produce from the probe data representative of the surface,
means for storing the data representative of the surface,
means for providing at least a positioning of the probe with respect to the sample surface in response to the stored data to control the probe in the X, Y and Z directions in accordance with some function of the stored data, and
means for measuring an electric or magnetic interaction between the probe and sample during the positioning of the probe in response to the stored data.

22. The apparatus of claim 21 wherein the means for positioning of the probe with respect to the sample surface includes means to raise the probe a fixed distance above the sample.

23. The apparatus of claim 21 including means to alternate between the first scan and the positioning of the probe in response to the stored data on a point by point basis.

24. The apparatus of claim 21 including means to alternate between the first scan and the positioning of the probe in response to the stored data on a line by line basis.

25. The apparatus of claim 21 including means to alternate between the first scan and the positioning of the probe in response to the stored data on an image by image basis.

26. An apparatus for producing an interaction, between a probe and the surface of a sample, including:
means for providing a first scan of the probe relative to the surface of the sample at a plurality of positions in the X and Y plane,
means for controlling the probe during the first scan at the plurality of positions in a Z direction vertical to the surface to measure the surface and to produce data representative of the surface at the plurality of positions,
means for storing the data representative of the surface at the plurality of positions,
means for providing a positioning of the probe relative to the surface of the sample and controlling the Z direction of the probe in accordance with some function of the stored data representative of the surface, and
means for producing an interaction between the probe and the surface of the sample during the positioning of the probe in accordance with some function of the stored data.

27. The apparatus of claim 26 wherein the measurement of data during the first scan is provided by an atomic force.

28. The apparatus of claim 26 wherein the measurement of data during the first scan is provided by a tunneling current.

29. The apparatus of claim 26 wherein the measurement of data during the first scan is provided by a shear force.

30. The apparatus of claim 26 wherein the interaction, between the probe and the sample during the positioning of the probe in accordance with the stored data is a measurement of magnetic forces.

31. The apparatus of claim 30 wherein the measurement of magnetic forces includes a measurement of magnetic fields, magnetic gradient or both.

32. The apparatus of claim 26 wherein the interaction between the probe and the sample during the positioning of the probe in accordance with the stored data is a measurement of electric forces.

33. The apparatus of claim 26 wherein the interaction between the probe and the sample during the positioning of the probe in accordance with the stored data is a measurement of electro-chemical forces.

34. The apparatus of claim 26 wherein the interaction between the probe and the sample during the positioning of the probe in accordance with the stored data is a measurement of light intensity.

35. The apparatus of claim 26 including the additional step of producing separate data from the first scan and the interaction of the probe and sample during positioning of the probe in accordance with some function of the stored data.

36. The apparatus of claim 26 including means for alternating between the first scan and the positioning of the probe in accordance with the stored data on a line by line basis.

37. The apparatus of claim 26 including means for alternating between the first scan and the positioning of the probe in accordance with the stored data on an image by image basis.

* * * * *

/ REEXAMINATION CERTIFICATE (3413rd)

United States Patent [19]

Elings et al.

[11] B1 5,418,363

[45] Certificate Issued Jan. 6, 1998

[54] SCANNING PROBE MICROSCOPE USING STORED DATA FOR VERTICAL PROBE POSITIONING

[75] Inventors: Virgil B. Elings; John A. Gurley, both of Santa Barbara, Calif.

[73] Assignee: Digital Instruments, Inc., Santa Barbara, Calif.

Reexamination Request:
No. 90/004,604, Apr. 10, 1997

Reexamination Certificate for:
Patent No.: 5,418,363
Issued: May 23, 1995
Appl. No.: 202,287
Filed: Feb. 25, 1994

Related U.S. Application Data

[63] Continuation-in-part of Ser. No. 982,871, Nov. 30, 1992, Pat. No. 5,308,974.

[51] Int. Cl.[6] .................................................. G01B 21/30
[52] U.S. Cl. ............................. 250/306; 73/105; 369/126

[56] References Cited

PUBLICATIONS

Lin et al., "High Resolution Photoelectrochemical Etching of n–GaAs with the Scanning Electrochemical and Tunneling Microscope"; pp. 1038–1039; Jan. 1987.

*Primary Examiner*—Que T. Le

[57] ABSTRACT

An apparatus and method for scanning a probe over a surface to either produce a measurement of the surface representative of a parameter other than the topography of the surface or to perform a task on the surface. The scanning operation is divided into two parts and with a first scan to obtain and store topographical information and with a second scan to measure the parameter of the surface other than topography or to perform the task while the probe height is controlled using the stored topographic information.

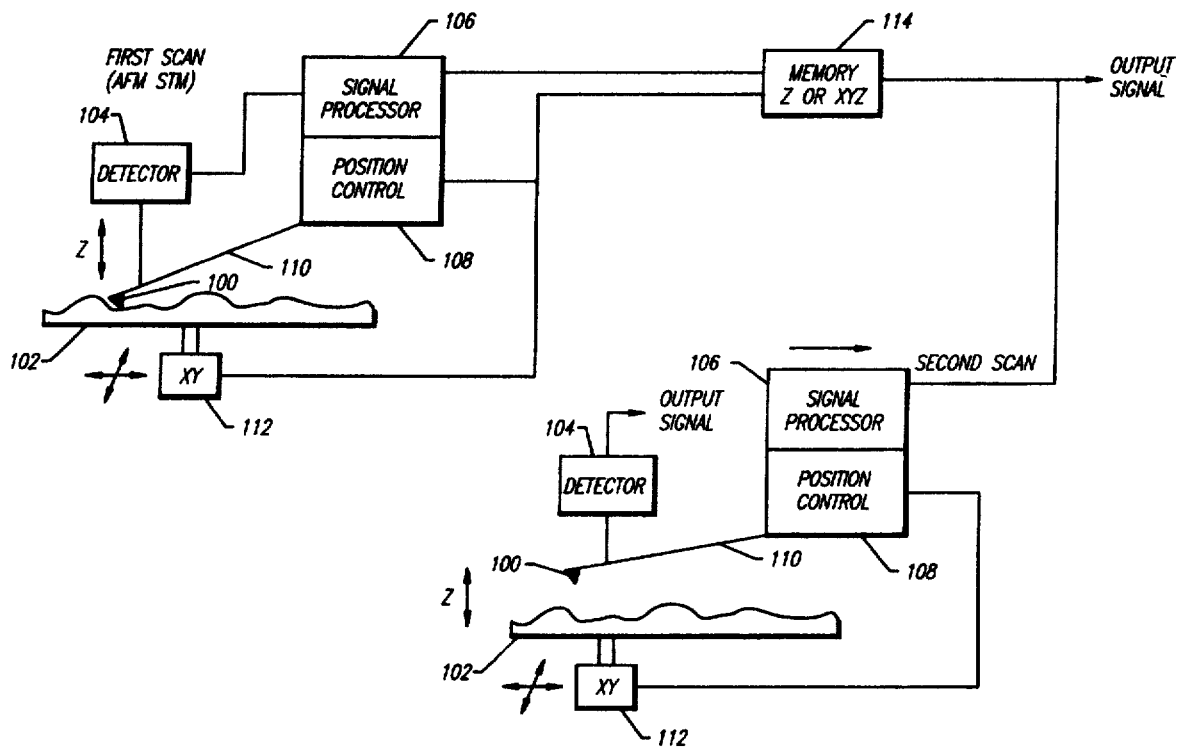

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 21–25 is confirmed.

Claims 9, 14, 17, 28, 33 and 35 are cancelled.

Claims 1, 7, 8, 11, 13, 15, 26, 30, 32 and 34 are determined to be patentable as amended.

Claims 2–6, 10, 12, 16, 18–20, 27, 29, 31, 36 and 37, dependent on an amended claim, are determined to be patentable.

1. In an atomic force microscope including a probe positioned relative to a sample surface and having relative motion between the probe and the sample surface in the X and Y plane and controlled and sensed in the Z direction vertical to the surface to produce data responsive to the topography of the surface, a method for accurately measuring a parameter of the surface [or performing a task] including the following steps:

providing a first measurement by the probe of the sample surface in the X and Y plane and controlling and sensing in the Z direction vertical to the surface to produce from the probe data representative of the surface, storing the data representative of the surface, positioning the probe at at least one point relative to the sample surface in response to the stored data to control the probe in the X, Y and Z directions in accordance with the stored data, and measuring a magnetic or electric interaction between the probe and sample during the positioning of the probe relative to the sample surface in response to the stored data.

7. A method [for producing] *of measuring* an interaction, between a probe *of an atomic force microscope* and the surface of a sample, including the following steps, providing a first measurement of the probe relative to the surface of the sample at a plurality of positions in the X and Y plane, controlling the probe during the first measurement at the plurality of positions in a Z direction vertical to the surface to measure the topography of the surface and to produce data representative of the topography at the plurality of positions, storing the data representative of the topography of the surface at the plurality of positions, positioning the probe relative to the surface of the sample and controlling the Z direction of the probe in accordance with some function of the stored data representative of the topography at the plurality of positions, and

[producing] *measuring* an interaction, betwee the probe and the sample during the positioning of the probe relative to the sample surface in response to the stored data.

8. The method of claim 7 wherein the measurement of data during the first measurement is [provided by an atomic force] *done with an oscillating probe.*

11. The method of claim 7 wherein the interaction between the probe and the sample during the positioning of the probe is [a measurement of] *due to* magnetic forces.

13. The method of claim 7 wherein the interaction between the probe and the sample during the positioning of the probe is [a measurement of] *due to* electric forces.

15. The method of claim 7 wherein the [interaction between the probe and the sample] *measurement* during the positioning of the probe is a measurement of light intensity.

26. An apparatus for [producing] *measuring* an interaction, between a probe and the surface of a sample, including:

means for providing a first scan of the probe relative to the surface of the sample at a plurality of positions in the X and Y plane, means for controlling the probe during the first scan at the plurality of positions in a Z direction vertical to the surface to measure the surfaces and to produce data representative of the surface at the plurality of positions, means for storing the data representative of the surface at the plurality of positions, means for providing a positioning of the probe relative to the surface of the sample and controlling the Z direction of the probe in accordance with some function of the stored data representative of the surface, and means for [producing] *measuring* an interaction between the probe and the surface of the sample during the positioning of the probe in accordance with some function of the stored data.

30. The apparatus of claim 26 wherein the interaction, between the probe and the sample during the positioning of the probe in accordance with the stored data is a [measurement of] magnetic force[s].

32. The apparatus of claim 26 wherein the interaction between the probe and the sample during positioning of the probe in accordance with the stored data is [a measurement of] *an* electric force[s].

34. The apparatus of claim 26 wherein the [interaction between the probe and the sample] *measurement* during the positioning of the probe in accordance with the stored data is a measurement of light intensity.

* * * * *